Dec. 12, 1950  H. W. DELANEY  2,533,227
APPARATUS FOR THE MANUFACTURE OF TWIST DRILLS
Original Filed May 31, 1941  6 Sheets-Sheet 1

INVENTOR.
Harry W. Delaney
BY Barnes, Kisselle, Laughlin & Raisch

Dec. 12, 1950      H. W. DELANEY      2,533,227
APPARATUS FOR THE MANUFACTURE OF TWIST DRILLS
Original Filed May 31, 1941      6 Sheets-Sheet 2

INVENTOR.
*Harry W. Delaney*
BY
*Barnes, Kisselle, Laughlin + Raisch*

Dec. 12, 1950  H. W. DELANEY  2,533,227
APPARATUS FOR THE MANUFACTURE OF TWIST DRILLS
Original Filed May 31, 1941  6 Sheets-Sheet 5

INVENTOR.
Harry W. Delaney
BY Barnes, Kisselle, Laughlin & Raisch

Dec. 12, 1950      H. W. DELANEY      2,533,227
APPARATUS FOR THE MANUFACTURE OF TWIST DRILLS
Original Filed May 31, 1941      6 Sheets-Sheet 6

INVENTOR.
Harry W. Delaney
BY Barnes, Kisselle, Laughlin + Raisch

Patented Dec. 12, 1950

2,533,227

UNITED STATES PATENT OFFICE 2,533,227

APPARATUS FOR THE MANUFACTURE OF TWIST DRILLS

Harry W. Delaney, Chicago, Ill.

Original application May 31, 1941, Serial No. 395,961, now Patent No. 2,457,132, dated December 28, 1948. Divided and this application November 1, 1946, Serial No. 707,144

10 Claims. (Cl. 76—5)

1

This invention relates to apparatus for the manufacture of twist drills.

This application is a division of my co-pending application Serial No. 395,961, filed May 31, 1941, which issued as Patent No. 2,457,132, dated December 28, 1948.

Heretofore, the common commercial means of manufacturing drills has comprised milling them from bar stock of a diameter slightly larger than that of the finished drill. Drills have also been made by twisting stock.

It is proposed herein to manufacture twist drills from stock which is considerably smaller in cross section than the finished size of the drill, by means of rolling grooves in the stock, twisting it and rolling the outside diameter. These twisted pieces of stock may be made up in any desired length, for example, between fifteen and sixty inches long. To complete the drill, it is necessary to cut these bars of stock to any desired length and then finish the drills by hardening, drawing, sand blasting, grinding the outer diameter, and pointing. This facilitates the speedy production and delivery of drills of odd lengths.

Drills manufactured by the method disclosed herein have a manufacturing cost of from one-half to one-third the cost of milled type drills. Contributing factors to this economy are the small size of stock used, the high rolling speed possible, and the fine grain structure given to the steel by rolling which obviates the necessity of purchasing ground and polished steel. In addition, long drills may be made substantially as cheap as short drills.

By means to be described herein, a very hard cutting edge is obtained. An air blast is used to equalize the heat of the bar stock preparatory to its being twisted so that twist of the drill will be uniform. In addition, rolls are provided which are adjustable in two directions to accommodate drills of various diameters, and a novel and flexible twisting means is disclosed. Further advantages of the method and apparatus will be apparent from the following description.

2

The method of manufacturing twist drills to be described herein comprises the following operations: Rolling the bar stock to give it a flattened cross section, rolling the flattened stock to flute it, twisting the fluted stock, rolling the outside diameter, cutting to lengths if required, hardening the twisted stock, and finishing the drill. In the preferred method the steps of rolling the stock to flute it, twisting and rolling the outside diameter are preferably all performed in one heat. However, satisfactory results have been obtained where only the steps of rolling the stock to flute it and twisting it are performed in one heat. The stock is then annealed and the outside diameter rolled cold in this alternative method. In addition, the above operations produce beads along alternate edges of the flutes which, after hardening, have a portion thereof ground off to produce a cutting edge. The above operations may be performed on blank of any desired length which later may be cut to desired drill length.

Figures 1, 2, 3, 4, 5, 6, 7:
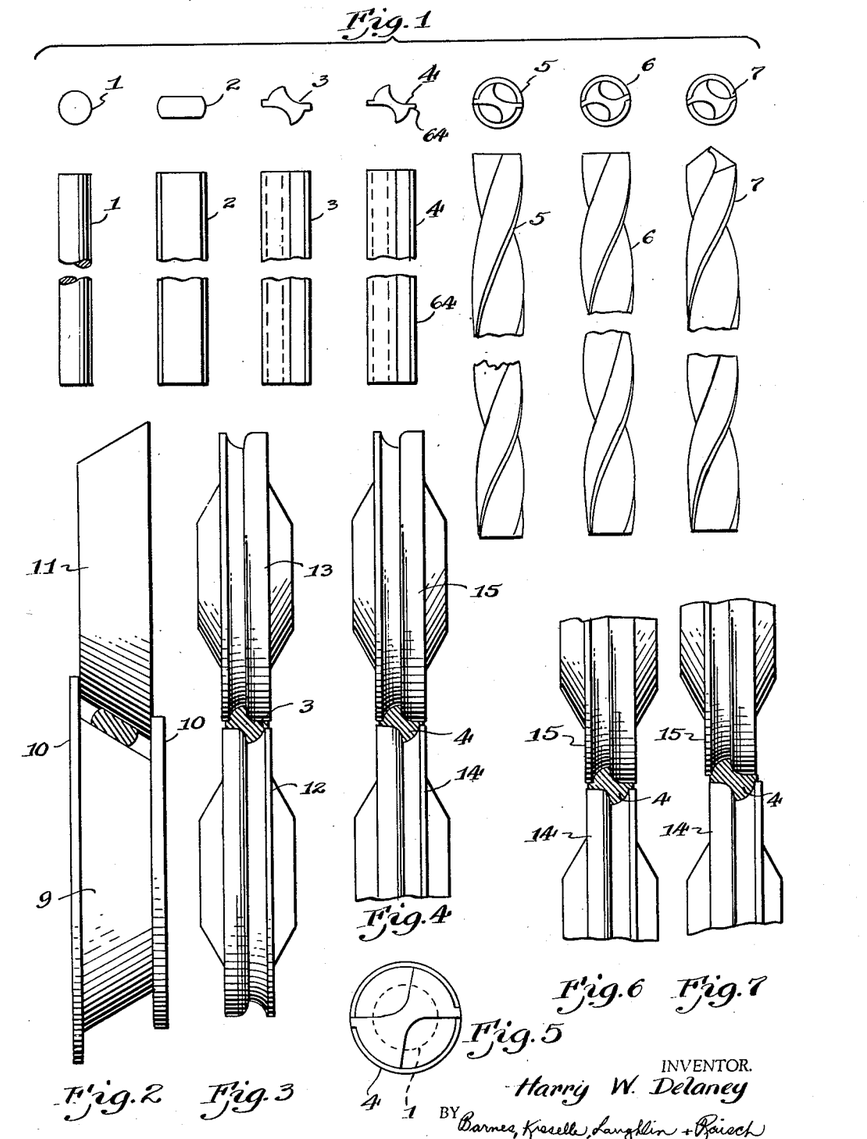
Figure 1 illustrates a side and end view of a bar of stock at the various stages of its manufacture into a completed drill.
Figure 2 is an end view of the slabbing rolls.
Figure 3 is an end view of the rough grooving rolls.
Figure 4 is a partial end view of the finishing rolls.
Figure 5 is a diagrammatic view showing that a drill is formed from the stock of a smaller diameter.
Figures 6 and 7 are partial vertical views of a pair of cooperating rolls adjusted in different vertical and horizontal directions to accommodate drills of different sizes.

Referring to Figure 1, a bar of stock is shown in progressive stages of its formation into a completed drill. The numeral 1 designates the bar stock from which the drill is to be made. This is illustrated as stock of circular cross section, but it is to be understood that stock of other cross section could be used. It should also be noted that the diameter of the stock is considerably less than the diameter of the finished drill. The numeral 2 designates the bar after it has passed through the slabbing rolls illustrated in Figure 2. The numeral 3 designates the bar after passing through the rough grooving rolls. At 4 the bar is shown after having passed through the finishing rolls illustrated in Figure 4. The numeral 5 designates the bar after the heat therein has been made uniform in a manner to be hereinafter described and the bar has been twisted. At 6 the bar is shown after the outside diameter has been rolled in the device shown in Figures 18 and 19. The finished and pointed drill is shown at 7.

The bar stock shown by numeral 1 of Figure 1 is heated to a suitable temperature, preferably between 1800° and 2100° F. to facilitate the mechanical working to which it is to be subjected by subsequent operations. In the preferred method all of the subsequent operations up to and including rolling the outside diameter are performed in this one heat. In an alternate method, however, satisfactory results have been obtained where only the steps up to and including twisting the stock are performed in this one heat. The stock is then annealed and the outside diameter rolled cold. After the bar stock is removed from the furnace it is fed to the slabbing rolls of Figure 2.

The first or slabbing rolls are shown in Figure 2. These rolls are preferably in the form of cooperating frustums. One of the rolls 9 is preferably provided with flanges 10 adapted to receive the cooperating roll 11. The flattened stock is in a tilted position when it emerges from these rolls so that it is in proper position to be fed to the rough grooving rolls 12 and 13 of Figure 3. The stock is then fed through finishing rolls 14 and 15 of Figure 4. It should be noted that the rolls of Figures 3 and 4 cooperate to produce a pair of longitudinal flutes in the bar stock and to produce a bead on alternate edges of said flutes. No configurations on the surface of the rolls are necessary to produce these beads. They are formed by allowing the metal to flow freely in an outward direction between the spaced outer flanges of the cooperating rolls. If desired, the beads could be rolled thereon by a separate operation.

The rolls of Figures 3 and 4 are preferably mounted so that they are relatively adjustable in either a horizontal or vertical direction. As shown in Figures 6 and 7, such adjustment permits the reception of bar stock of larger diameter. The one set of rolls therefore may be used to produce drills of several desired sizes. The surfaces of rolls 14 and 15 of Figure 4 are adapted to roll the stock to the shape designated by numeral 4 of Figure 1. The rough grooving rolls of Figure 3 and the finishing rolls of Figure 4 are substantially identical except that the rolls of Figure 4 are positioned closer together.

Referring to Figure 5 it will be seen that the rolling operations just described increase the diameter of the drill over that of the original bar stock. The numeral 1 designates the bar stock before rolling and the numeral 4 designates the drill after it has passed through the finishing rolls of Figure 4. Bar stock 1 also lengthens in rolling.

Figure 8:
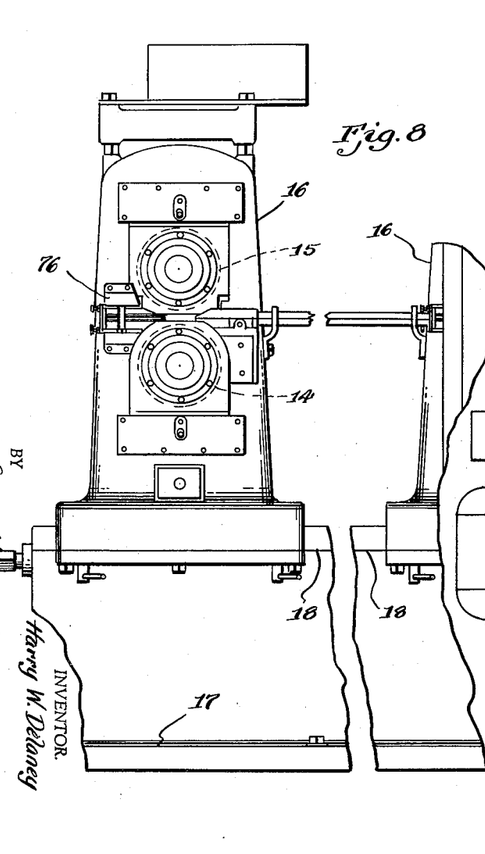
Figure 8 is a partial front elevation of a rolling mill.
Figure 9:
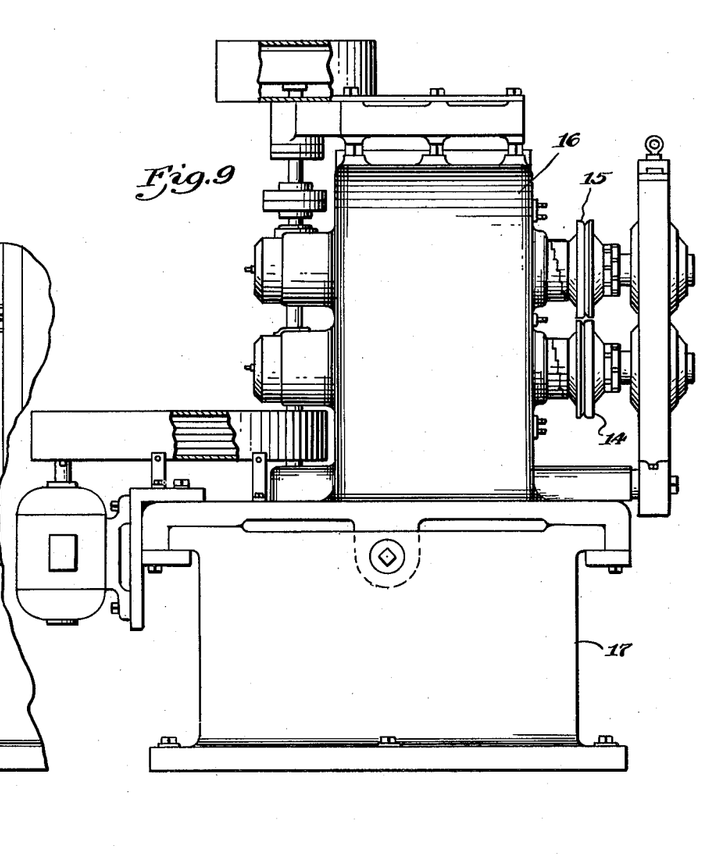
Figure 9 is an end view of a rolling mill.

Figure 9 is an end view of a rolling mill showing the rolls 14 and 15 therein and Figure 8 is a partial side view of the same rolling mill. It will be noted that each pair of rolls is retained by a separate housing 16. Each housing 16 is slidably mounted upon a base 17 provided with ways 18. It is thus apparent that the housings may be adjusted relative to each other so that the distance between pairs of rolls is variable. This permits shortening the distance between pairs of rolls to accommodate bars of stock of shorter length so that the stock may run continuously through the rolls. The customary stripper is shown at 76 to prevent adhesion of metal to the rolls.

Following the above described rolling operations and before twisting the bar of stock, air is applied to the rolled fluted stock to equalize the temperature throughout its length so that the twist will be uniform. The end of the bar which was nearer the door of the furnace in the heating operation will be cooler than the end which was deep in the furnace. The application of air to the hotter end overcomes this. An ordinary air hose has been found quite satisfactory for this purpose.

Figure 10:
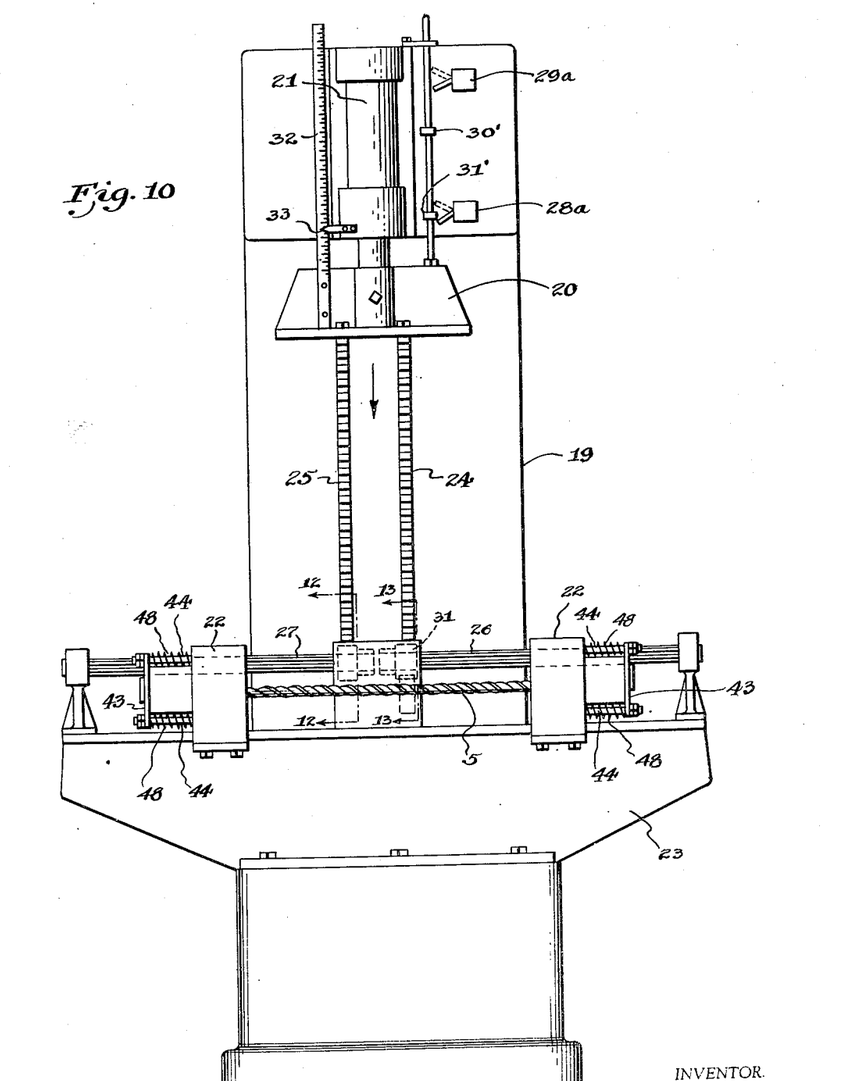
Figure 10 is a front elevation of a twisting machine.
Figure 11:
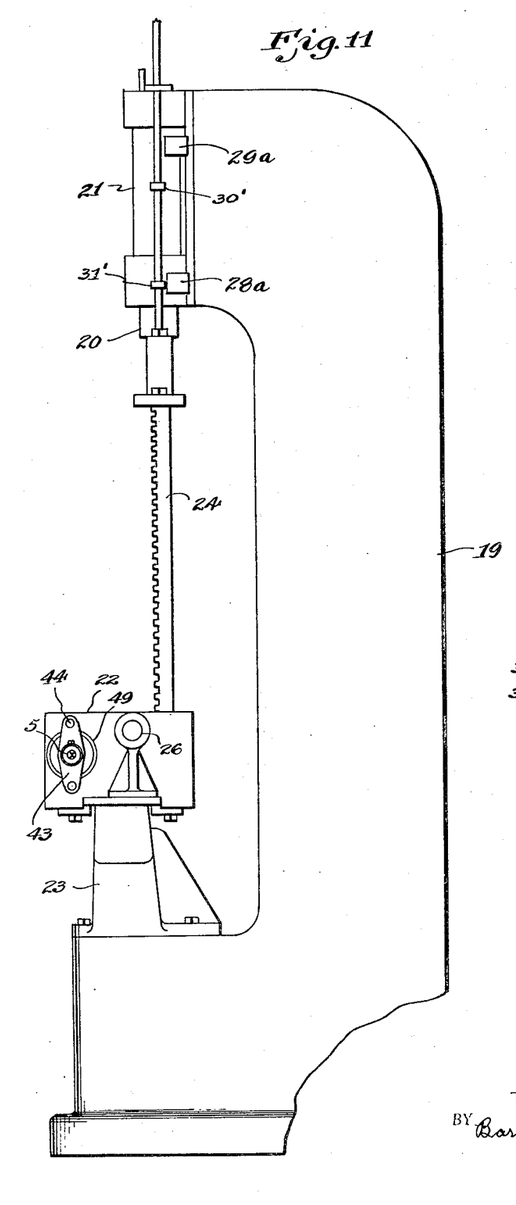
Figure 11 is a side elevation of a twisting machine.

Figure 10 shows a front view and Figure 11 a side view of the twisting machine. A hydraulic press frame 19 has a head 20 slidably mounted thereon and adapted to be actuated by the hydraulic cylinder 21 and piston (not shown). Twisting fixtures 22 are mounted upon a base member 23 fastened to the frame 19. The bar or drill to be twisted herein is shown at 5. This bar has each end retained in one of the twisting fixtures 22. Reciprocation of the press head 20 in a vertical plane is transmitted to rotary movement of chucks within the twisting fixtures 22 by means of gear racks 24 and 25, and suitable pinions gears. It should be noted that the twisting fixtures 22 are slidably mounted upon the base member 23. This permits bar 5 of different lengths to be accommodated. Splined shafts 26 and 27 transmit motion from pinion gears which engage the gear racks 24 and 25 to the twisting fixtures 22 and permit relative movement between the twisting fixtures and the splined shafts. The splined shafts are rotatably mounted in suitable bearings as shown. It will be apparent that the amount of vertical movement of the head 20 deteimnes the number of revolutions of the chucks in twisting fixtures 22 and therefore the amount of twist in the drill 5. Suitable limit switches 28a and 29a are adapted to stop movement of the head when engaged by adjustable members 30' and 31' which reciprocate with the head. It is also desirable to provide a scale 32 and pointer 33 to indicate to the operator the lead or pitch that he is imparting to the bar being twisted. The scale 32 is fastened to the reciprocating head and the pointer is fastened to a stationary object, such as the frame 19. The calibrations are preferably in terms of twist or pitch.

Figure 12:
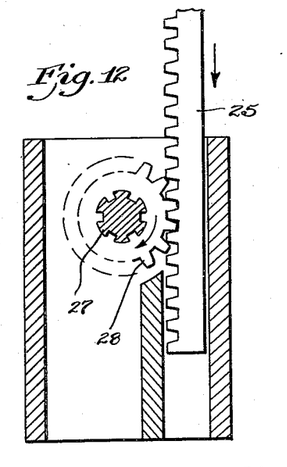
Figure 12 is a section on the line 12—12 of Figure 10.
Figure 13:
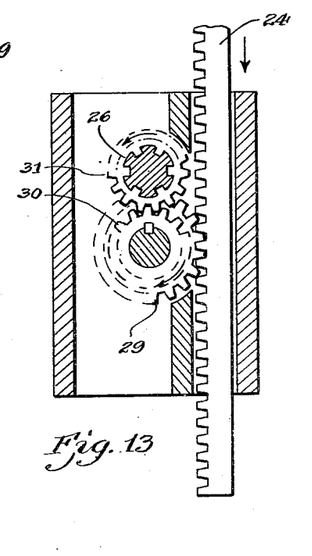
Figure 13 is a section on the line 13—13 of Figure 10.

Figures 12 and 13 illustrate the means of converting the linear motion of the gear racks 24 and 25 into the desired rotation of splined shafts 26 and 27. In Figure 12 a pinion gear 28 is keyed to the splined shaft 27 and engaged by the gear rack 25. In Figure 13 additional pinion gears must be provided so that the direction of rotation of the splined shaft 26 will be opposite to that of the splined shaft 27. To this end a pinion gear 29 is engaged by gear rack 24 and rotates a pinion gear 30 keyed thereto. The gear 30 engages a gear 31 on the splined shaft 26. The relative diameters of these gears may be chosen by empirical means in accordance with the amount of rotation desired.

Figures 14, 16:
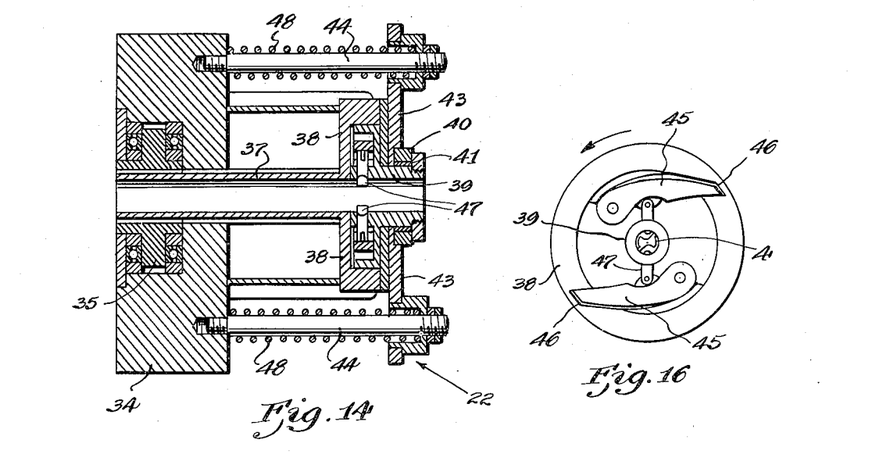
Figure 14 is a vertical section of one twisting fixture used on the twisting machine, and taken on the line 14—14 of Figure 15.
Figure 16 is an end view of the chuck showing it in open position.
Figures 15, 17:
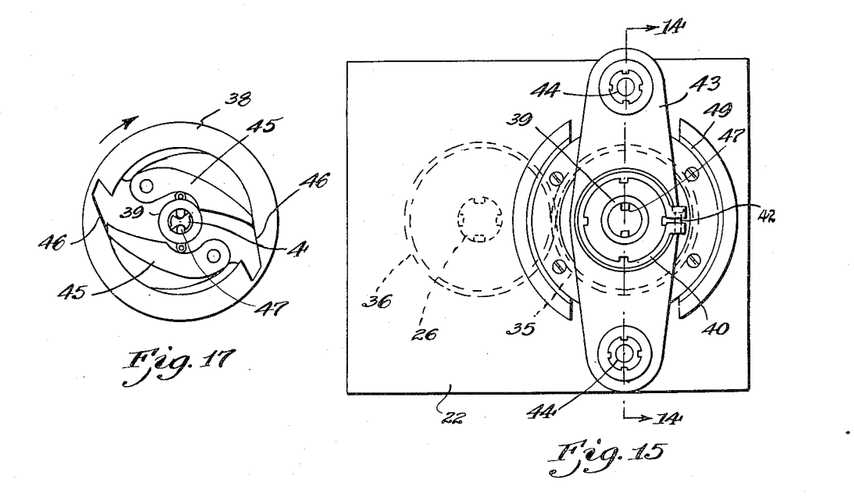
Figure 15 is an end view of one twisting fixture.
Figure 17 is an end view of the chuck showing it in closed position.

Illustrated in Figures 14 through 17 is one of the twisting fixtures 22. The twisting fixtures comprise self-locking and unlocking chucks which grasp the straight rolled fluted bar at each end and twist the same, simultaneously moving towards each other as the bar shortens in twisting. At the completion of the twisting the fixtures automatically release the drill and return to starting position leaving the chuck clear to permit removal of the twisted bar or drill. A twisting fixture 22 illustrated in Figure 14 comprises a housing 34. A pinion gear 35 is rotatably mounted in the housing 34 and adapted to be actuated by rotation of the splined shaft 26. Suitable intermediate gears 36 diagrammatically illustrated by dotted lines in Figure 15, cause rotation of gear 35. Gear 35 is slidably keyed to a hollow shaft 37 which is an extension of a cylindrical outer chuck housing 38. A hollow inner chuck housing 39 is prevented from rotating by a stationary brake ring 40 which may be provided with a brake lining 41 and an adjusting screw 42. Accurate bushings 49 are provided to retain the chuck elements. Brake ring 40 is rigidly fastened to a member 43 which is slidably mounted on a pair of parallel shafts 44. Referring to Figures 16 and 17, a chuck proper is illustrated. The fluted shaft 4 which is to be twisted is received by the hollow inner chuck housing 39 and extends through the hollow shaft 37 shown in Figure 14. Pivotally mounted on inner chuck housing 39 are fingers 45. Outer chuck housing 38 is provided with recesses 46 adapted to engage the ends of fingers 45 and pivot them outwardly when the relative rotation of the housings is in one direction (Figure 16). When the outer chuck housing is rotated in the direction shown in Figure 17, the fingers 45 engage the inner surface thereof and are forced pivotally inward toward the axis of the housings. Small pins 47 slidably project through the inner chuck housing 39 and are adapted to engage the flutes of the bar or drill 4. Each pin 47 is pivotally fastened to one of the fingers 45. It is therefore apparent that the pivotal motion of the fingers 45 described above, will cause the pins 47 to engage or completely disengage the bar or drill 4. When disengaged as shown in Figure 16 they are retracted into the inner housing and permit free removal of the drill. Since shaft 37 is slidable relative to gear 35 and member 43 is slidable relative to shafts 44, it is apparent that as the frame head 20 of the hydraulic press travels in one direction and rotates gears 35 and their respective chucks to cause engagement of pins 47 on drill 4 to twist the same, the entire chuck assembly, including member 43 may slide toward the left as shown in Figure 14. The distance between the chucks of the two twisting fixtures 22 is thereby shortened as the bars shorten in twisting. When the head 20 has been stopped by its limit switch and reversed, the rotation of gear 35 and outer chuck housing 38 will be reversed and the pinions 47 will disengage the drill 4 as shown in Figure 16. The drill 4 may then be removed without the necessity of twisting it so that the pins could follow the flutes. Compression springs 48 on shafts 44 by engaging housing 34 and member 43, are adapted to slidably return the chuck members to their initial position shown in Figure 14. It is, of course, understood that the two twisting features 22 shown in Figure 10 are bisymmetrical.

When it is desired to twist a bar of different diameter the chuck pins 47 may be exchanged for chuck pins of a length adapted to engage a bar of that particular diameter. To change the lead or pitch of the twisted bar the stroke of the hydraulic press may be shortened or lengthened. To accommodate a bar of different length the twisting fixtures 22 may be slidably adjusted on the base member 23 as desired.

Figures 18, 19, 20, 21, 22:
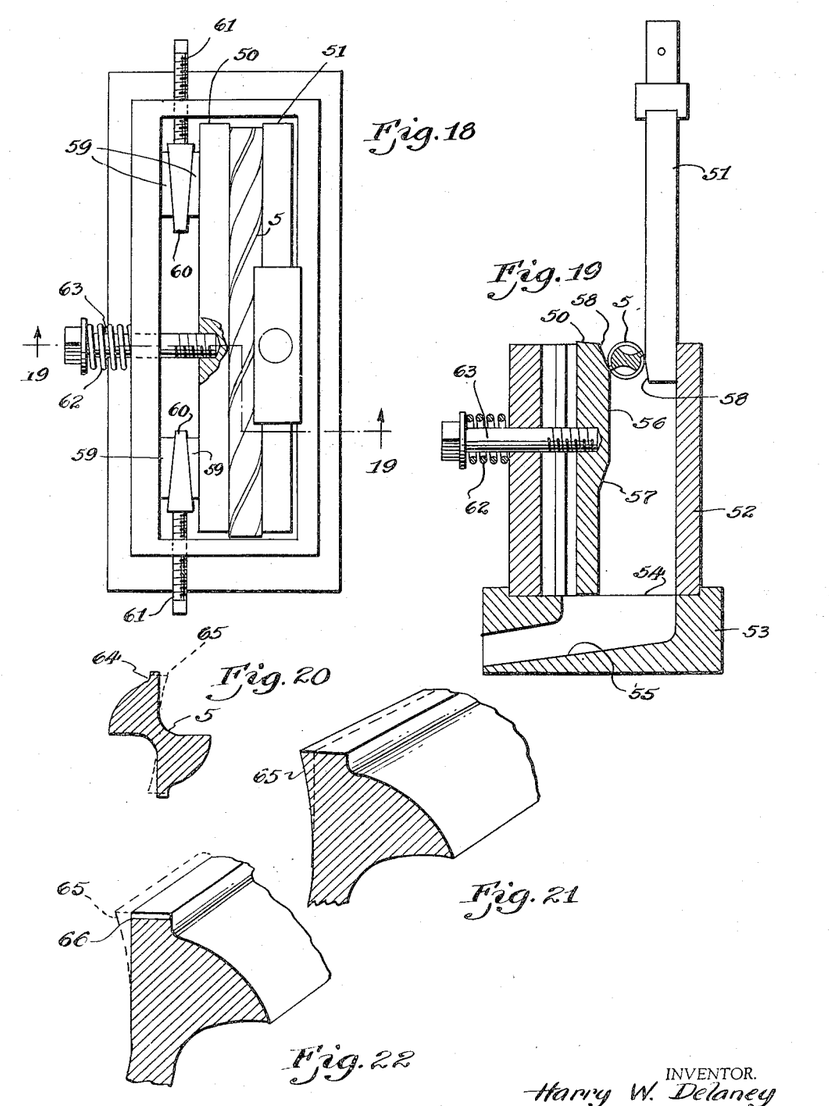
Figure 18 is a plan view of the rolling plates.
Figure 19 is a vertical section of the rolling plates taken on the line 19—19 of Figure 18.
Figure 20 is a cross section of the drill showing the hook formed on each cutting edge in dotted lines.
Figure 21 is a perspective view of a portion of a drill showing the hook created by rolling between the plates of Figure 19.
Figure 22 is a perspective view of a portion of a drill showing the portions which are ground off after hardening to expose the cutting edge.

The next step of the process comprises a rolling operation performed upon the twisted bar. This rolling operation compacts the metal at the cutting lip, straightens the twisted bar longitudinally and throws a hook upon the cutting edge (as shown in Figures 20 through 22). A device adapted to perform this operation is illustrated in Figures 18 and 19. This device is adapted to roll the drill or bar between two relatively movable parallel plates 50 and 51. A hollow rectangular frame 52 is mounted upon a base 53. The plate 50 is mounted in the frame 52. The plate 51 is slidably mounted in the frame 52. Suitable power means (not shown) may be provided to cause vertical reciprocation of plate 51. An opening 54 and an inclined track 55 permit automatic disposal of the drill after it has been released by the plates. The upper portion of plate 50 is provided with its working surface 56. The lower part of plate 50 is recessed at 57 to release the drill when it reaches that position. The drill then falls by gravity through opening 54 and rolls down inclined track 55. The plates are preferably beveled along their coacting edges as at 58 to assure smooth engagement of drill 5. Plate 50 may be adjusted to take care of drills of different diameters. To this end cooperating wedges 59 and 60 comprises the back support of plate 50. An adjusting screw 61 threaded through frame 52 and fastened to wedge 60 permits relative movement of the wedges and thereby adjustment of plate 50. A compression spring 62 acting upon frame 52 and a rod 63 fastened to plate 50 is preferably used to resiliently take up any adjustment of the wedges.

A particularly good cutting edge is obtained by the method of manufacture herein described. It should be noted that the rolling operations performed by the rollers shown in Figures 3 and 4 provide the bar with longitudinal beads 64. The twisting operation of the device shown in Figures 10 through 17 made these beads helical (see numeral 5 of Figure 1). Figure 20 illustrates a cross-section of the drill as provided with the beads 64. Rolling the drill between the plates of the device shown in Figures 18 and 19 throws a hook 65 on these lips or edges of the drill. The hook 65 is shown in dotted lines in Figure 22. Figure 21 is a partial view of a drill provided with the hook 65. The reason for this hook 65 will now be described. It is necessary that the drill be hardened by proper heat treatment. All steels including high speed steel acquire a soft skin when heated over about 1400° F. Therefore, the hardening operation leaves a soft surface on the cutting edge. The hook 65 is ground off after the hardening operation to remove the soft skin and expose a hard cutting edge 66. The grinding may be done by any well known means. The hook 65 created by rolling the drill in the device of Figures 18 and 19 might be said to be put there for the express purpose of termporarily taking the skin softness acquired in hot working the drill. The surfaces to be ground off are shown in Figure 22. The section which is cross-hatched is the final cross section of the drill with the hook and top surface of the bead removed.

Thus it can be seen that the method of manufacturing twist drills disclosed herein in conjunction with the apparatus described enables the production of twist drills at a greatly reduced cost through the use of small size stock and high rolling speed. The grain refinement which results from the working of the steel eliminates the necessity of puchasing ground and polished steel and the unique rolling operation which temporarily provides an excess of metal adjacent the cutting edge insures a uniformly hard cutting edge of long life.

What I claim is:

1. An apparatus adapted to twist fluted bar stock comprising a pair of chuck elements each having a rotatable portion adapted to engage the ends of a bar of stock, power means to rotate said portion of the chuck elements whereby said bar of stock is twisted, each of said chuck elements comprising an outer housing, an inner chuck housing slidably mounted on said outer housing, said power means including a driving member on said outer housing slidably associated with the inner housing for rotating the inner housing when the driving member is actuated, said inner chuck housing containing fingers rotatable with said inner housing and having gripping means thereon adapted to engage the bar stock to be twisted, said housings being provided with a cylindrical opening adapted to receive the bar stock to be twisted, whereby rotation of said inner housing twisting of the bar stock and the slidable mounting of the inner chuck housing permits the twisting bar stock to shorten, means to automatically release said fingers and resilient means to return said inner housing to initial position.

2. An apparatus adapted to twist fluted bar stock comprising a pair of chuck elements each having a rotatable portion adapted to engage the ends of a bar of stock, power means to rotate said portion of the chuck elements whereby said bar of stock is twisted, each of said chuck elements comprising an outer unit and an inner unit slidably mounted on said outer unit, said inner unit comprising a rotatable outer housing and an inner housing, braking means to resist rotation of said inner housing, said inner housing containing fingers having gripping means thereon adapted to engage the bar stock to be twisted, cam means on said outer housing to actuate said fingers and gripping means when the outer housing is rotated relative to the inner housing to engage said bar stock, said outer unit and inner unit being provided with a cylindrical opening adapted to receive the bar stock to be twisted whereby transmission of the rotation of the outer housing to the inner housing is resisted by the braking means and the relative rotation between the housings cams the fingers into engagement with the bar stock and some rotation is transmitted to the fingers whereby the stock is twisted and the slidable mounting of the inner unit permits the twisting bar stock to shorten, means to automatically release said fingers and resilient means to return said inner unit to initial position.

3. The combination as set forth in claim 2 wherein said gripping means comprises a pair of pins pivotally mounted on said fingers and extending substantially radially into said cylindrical opening, said pins being detachably mounted on said fingers to permit interchanging said pins with pins of different sizes to accommodate bar stock of various sizes.

4. Apparatus for use in the manufacture of twist drills comprising a pair of vertically spaced rolls adapted to flatten a length of heated round bar stock and feed it between one or more pairs of cooperating spaced rolls adapted to form flutes along the entire length of said bar stock and continuous beads along alternate edges of said flutes, a press having mounted thereon a pair of twisting chucks adapted to engage the ends of said fluted bar stock and twist it into drill shape, and a press having vertical plates adapted to roll said drill stock to a desired size and partially flow the metal of said bead into said flutes, said apparatus being so positioned as to permit all said operations to be performed as a substantially continuous process without further heating of the originally heated bar stock.

5. An apparatus for forming twist drills comprising means for rolling a length of heated round bar stock of multiple drill length into a drill blank having flutes extending longitudinally along the entire length of said blank and beads along alternate edges of said flutes, means for gripping the ends of said drill blank in the fluted portions thereof and twisting said ends in opposite directions to produce a drill blank having helical flutes of uniform lead extending the length of the blank and a pair of parallel relatively movable plates adapted to contact only said beads and flow a portion of the metal of said bead inwardly to form hooks on said flute edges, all of said means being so positioned as to permit all of said operations to be performed as a substantially continuous operation without further reheating of the originally heated bar stock.

6. The combination as set forth in claim 5 including means for applying a blast of air to localized portions of said blank before twisting to equalize the temperature of said blank from one end to the other so that the twist imparted by said twisting fixture will be uniform throughout the length of said bar.

7. An apparatus for forming twist drills from a length of heated round bar stock of multiple drill length comprising a pair of cooperating rolls each having a narrow circumferential flange and a wide circumferential flange separated by a recess around the periphery of the rolls, said rolls being spaced apart and bisymmetric in relation to each other so that the wide flanges indent the stock to form longitudinal flutes along the entire length of the stock and the narrow flange of one roll cooperates with a portion of the wide flange of the other roll to permit the free flow of metal therebetween to form beads along the alternate edges of said flutes, a pair of chuck members for gripping the ends of said fluted bar in the fluted portions thereof and twist said ends in opposite directions to produce a spirally fluted blank, and a pair of spaced relatively movable plates for rolling said spirally fluted bar down to a desired diameter, said plates being adapted to contact the beads only and flow a portion of said beads inwardly to form hooks on the alternate edges of said flutes, said rolls, chucks, and sizing plates being positioned such as to permit all of said operations to be performed as a substantially continuous operation without further reheating of the originally heated bar stock.

8. An apparatus for twisting bar stock comprising a base, a shaft rotatably mounted on said base, means for rotating said shaft, a pair of twisting heads mounted on said base, a rotatable chuck member slidably mounted on each of said twisting heads, means on said heads having a driving connection with said shaft and arranged to rotate said chuck member when said shaft is rotated, said last-mentioned means being rotatably fixed on said twisting head and having a slidable driving connection with said chuck members, said chuck members being adapted to engage the bar stock to be twisted, whereby when said chuck members are engaged with the ends of a bar of stock and rotated to twist said stock, the chuck members are permitted to move axially to compensate for the shortening of the stock caused by twisting while said twisting heads remain stationary on said base.

9. The combination as set forth in claim 8 wherein said driving means on the twisting heads have a slidable connection with said shaft and including means for adjustably mounting said twisting heads on said base, whereby the distance between them may be adjusted to accommodate bar stock of various lengths.

10. An apparatus for twisting bar stock comprising a support member, a chuck member slidably mounted on said support member, said chuck member comprising an inner housing and an outer housing, driving means on said support slidably connected with said outer housing for rotating said outer housing, means on said inner housing for gripping the end of a bar of stock, said inner and outer housings being provided with a cylindrical opening to receive a bar of stock to be twisted, means tending to resist rotation of the inner housing when the outer housing is rotated, and cam means on said outer housing providing a lost motion connection with the inner housing and arranged to actuate said gripping means to engage the end of the bar of stock inserted within said cylindrical opening when the outer housing is rotated, whereby when said outer housing is rotated said bar is twisted and the slidable mounting of the chuck members on the support members allows the twisting bar stock to shorten.

HARRY W. DELANEY.

REFERENCES CITED

The following references are of record in the file of this patent:

UNITED STATES PATENTS

| Number | Name | Date |
| --- | --- | --- |
| Re. 8,032 | Shortau | Jan. 8, 1878 |
| 234,362 | Williams | Nov. 9, 1880 |
| 392,119 | Hardsocg | Oct. 30, 1888 |
| 432,636 | Moore | July 22, 1890 |
| 1,106,928 | Denk | Aug. 11, 1914 |
| 1,341,636 | Deschauer | June 1, 1920 |
| 1,379,071 | Wineman | May 24, 1921 |
| 1,405,414 | Hervig | Feb. 7, 1922 |
| 1,463,594 | Rust | July 31, 1923 |
| 1,518,721 | Wineman | Dec. 9, 1924 |
| 1,543,608 | Leidecker | June 23, 1925 |

FOREIGN PATENTS

| Number | Country | Date |
| --- | --- | --- |
| 15,562 | Great Britain | July 12, 1902 |